2,781,068

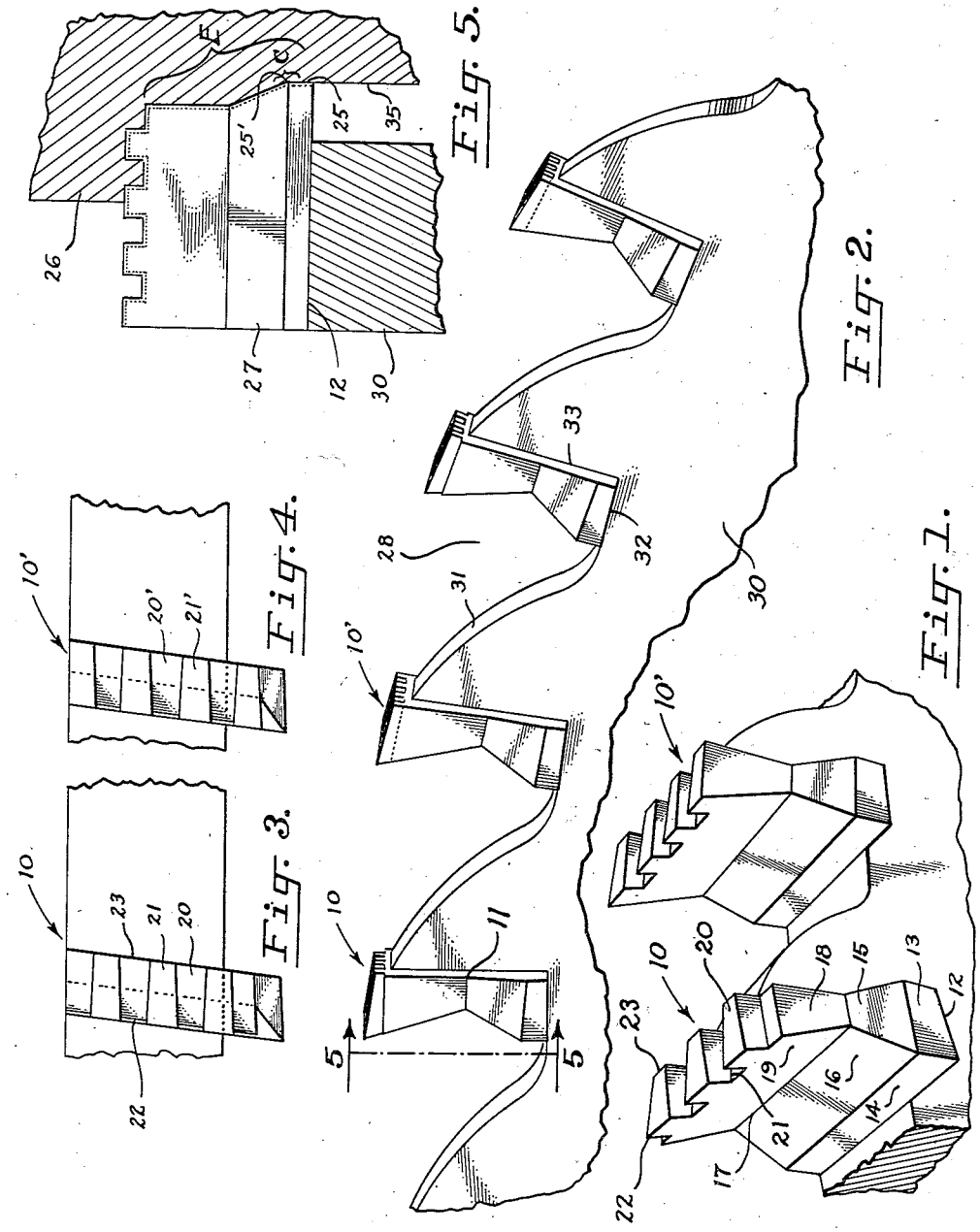
Feb. 12, 1957   V. E. ANDERSON   2,781,068
ROTARY JOINTER HEAD AND CUTTER
Filed Oct. 26, 1953
INVENTOR.
Victor E. Anderson United States Patent Office 2,781,068
Patented Feb. 12, 1957

ROTARY JOINTER HEAD AND CUTTER

Victor E. Anderson, Portland, Oreg., assignor to Prentice Machine Works, Inc., Portland, Oreg., a corporation of Oregon Application October 26, 1953, Serial No. 388,154

5 Claims. (Cl. 144—218)

This invention relates to cutters and cutter teeth, and particularly to jointer heads and teeth employed to cut a straight edge in a stack of veneer sheets.

In the manufacture of certain wood products such as plywood, it is necessary that a plurality of thin sheets of veneer be joined to each other in edge to edge abutting relation. The present invention is concerned with the long standing problem in plywood manufacturing of surfacing or preparing the edges of veneer sheets, so that they can be successfully secured to one another. In the manufacture of plywood, the edges are glued one against the other so that there will be no space, crack, indentation or any other interruption in the flat surface of a completed panel. It has been known that one of the most important single contributing factors to obtaining a satisfactory edge to edge bond between veneer sheets is to make the edges that are to be joined perfectly straight. If the edges of two sheets of veneer are straight, it is much easier to obtain a satisfactory bond between them.

Various arrangements of knives and saws have been proposed for producing straight edged veneer sheets; however, none of these have been completely satisfactory in that they do not produce veneer sheets having uniformly straight edges. Frequently the edges are uneven because of rotation marks left in the edges after they have been cut. Other times, even though the edges of the sheet may be straight right after they have been cut, they soon warp or twist, probably because of the tension set up in the sheets when they are laterally engaged by a high speed cutting head whose teeth pound the edges of the sheets.

These and other shortcomings of the conventional cutters are overcome by the present invention, wherein the cutter teeth lie in a plane which is substantially normal to that of the veneer sheets and the teeth remove all the excess material without pounding the edges of the veneer sheets and setting up any tensions therein. The edges of the veneer sheets are flat and straight and will not warp after they have been cut.

The jointer head of the invention is mounted on a carriage which is horizontally movable in a straight line with respect to a stack of veneer sheets which are firmly clamped in place. A motor rotates the cutter head at a relatively high rate of speed, of the order of 3500 R. P. M., and at the same time the carriage is moved linearly, at the rate of about 120' per minute into the stack of veneer sheets to trim the sheets so that they all have straight edges.

According to the invention, the jointer head is made up of a rotary body or wheel having a plurality of cutting teeth extending therefrom. Each tooth combines cutting functions normally carried out by two or more teeth. A main horizontal cutting edge on each tooth hogs, or rips out the major portion of the wood to be removed, while a side cutting edge at an angle to the main cutting edge acts as a finishing cutter by extending into the material just a little farther and slicing off the last bit of material to leave a clean, straight edge which is ready for jointing to another edge.

The invention will now be described in greater detail with reference to the following drawings in which;

Fig. 1 is a perspective view of two of the teeth according to the invention;

Fig. 2 is a side elevation of a portion of the head according to the invention;

Figs. 3 and 4 top plan views of two succeeding teeth in the head; and

Fig. 5 is an elevation along lines 5—5 of Fig. 2 showing a tooth cutting through veneer.

A jointer tooth, generally indicated at 10, has a straight back wall 11, and a flat rectangularly shaped base 12. Base 12 has straight side walls 13, 14 on which rest inwardly converging tooth walls 15, 16. Walls 15, 16 are joined at 17 to outwardly converging walls, 18, 19. Walls 16 and 19 define a V-shaped throat for the tooth. The throat could be otherwise shaped, such as U or crescent, as long as wall 19 has positive rake of from about 5° to 20° and wall 16 negative rake of from about 30° to 45°, and the throat is sufficiently deep to accommodate the removed material prior to dumping. The top surface of the tooth has a plurality of lands 20 and grooves 21, which are tapered from their leading or main cutting edges 22 to their trailing edges 23. The leading edges 22 of the lands form a horizontal cutting edge which is parallel to the axis of the cutterhead.

A finishing or side cutting edge is provided along the leading edge of the tooth, defined by the lines along which sides 13 and 14, 15 and 16, 18 and 19 join each other. The side cutting edge E is at an angle to the axis of the cutter head, and the base 12 projects to the side slightly more, in the particular tooth shown about an ⅛″, than the top surface of the tooth. Edge portion 25 of the side cutter lies along a radius of supporting wheel 30 in which the tooth is mounted. Point 25' on edge 25 where sides 13, 14, 15 and 16 join each other is that portion of the side cutter first to come in contact with the material to be cut, such as veneer 26, and portion C of the edge, which are those portions of E immediately adjacent point 25', do most of the finishing cutting operation. Edge portion C is angularly disposed with relation to the horizontal cutting edge. The other vertical side 27 of the tooth is flat and performs no cutting function. It should be noted that not only the lands and grooves are tapered from front to back, but also all the other walls of the tooth, so that it can pass more easily through the stock it is cutting, without burning or scorching of the material.

Tooth 10 is mounted in a head which is a rotary body or wheel 30, having a discontinuous periphery made up of a plurality of recesses 28. Each recess is defined by a curved or downwardly sloping leading wall 31, which terminates in a straight, horizontal wall 32 from which a flat, vertical trailing wall 33 rises at an angle of about 90°. Base 12 rests on wall 32 and wall 11 of the tooth is brazed to wall 33 of the recess. The top cutting edges of all the teeth project an equal distance from the periphery of the wheel, and the finishing cutting edges are arranged evenly to project from the side of the wheel. When the teeth are mounted in wheel 30, they are positioned so as to have from 3° to 20° positive shear angle.

The teeth are identical in construction, except that the lands and grooves in succeeding teeth are linearly staggered so that the grooves in the first tooth are in line with the lands in the second tooth and the lands in the first tooth are in line with the grooves in the second tooth. Referring to Figs. 3 and 4, it will be seen that lands 20 in tooth 10 are in line with grooves 21' in tooth 10' and grooves 21 in tooth 10 are in line with lands 20' in tooth 10'. In this manner, each tooth cooperates with another to remove the desired material or stock.

The main horizontal cutting surfaces, defined by the leading edges of the lands and grooves, act as hoggers for removing by a relatively rough cutting operation the majority of material which it is desired to remove. The last bit of material up to the desired edge is removed by finishing cutter edge C which slices through material 26 to leave a perfectly straight edge 35 therein. Because edges 35 on each veneer sheet in the stack are straight, they can subsequently be joined more readily to one another when the veneer sheets are made up into plywood panels.

While the teeth are shown as being permanently mounted on the wheel, they may be detachably mounted therein by set screws or some other fastening means. The teeth are preferably made from some hard cutting material, such as tungsten carbide or the like.

The rake, shear angles and size of teeth will, of course, vary with different cutting and work materials. The cutter head and teeth, which have been here described, are of a type which have been found to be eminently satisfactory for use in conjunction with fir veneer ranging in thickness from 1/28" to 3/16", and having moisture content of from 4% to 5%. The teeth in this head have about five degrees positive rake on the horizontal cutting edge, about thirty-eight degrees negative rake on the side cutting edge along side 16 and about five degrees positive shear. The hub or wheel on which the teeth are mounted has an outside diameter of seventeen inches and a total of forty-eight teeth are mounted around its periphery. The dimensions of a tooth are 13/16" wide across the top and 15/16" across the base, an overall height of 3/4", 1/4" thick at the top and base, and 1/8" thick at the narrowest portion of the throat.

While a preferred form of the invention has been here shown and described, it is to be understood that variations and changes therein will be suggested to those skilled in the art and it is intended to cover said variations and changes and to limit the invention only as defined in the appended claims.

I claim:

1. A tooth for a veneer jointer cutterhead having a rotary body comprising a plurality of tapered lands and grooves formed in the top surface of the tooth, the leading edges of the lands providing a horizontal main cutting edge, a rectangular base portion of the tooth extending laterally from one side of the tooth about an 1/8" beyond the side edge of the top surface, a V-shaped throat on the tooth, a straight back wall on the tooth, a finishing cutting edge formed along the projecting side edge angularly disposed with respect to the main cutting edge, the portions of said finishing edge immediately adjacent the point at the projecting side where the base and face of the tooth meet each other extending farthest from the side of the tooth.

2. A veneer jointer head for cutting a straight edge in a stack of veneer sheets comprising a wheel having a discontinuous periphery made up of a plurality of recesses, a plurality of cutting teeth mounted in the recesses on the wheel and projecting therefrom, each tooth comprising a main cutting surface at a positive rake angle, a plurality of tapered lands and grooves in the top of the tooth having sharpened leading edges, a tooth base mounted in the recess and projecting laterally approximately 1/8" from one side of the wheel, a finishing cutting edge formed along the side edge of the tooth projecting therefrom, the lands and grooves in succeeding teeth being linearly staggered so that the grooves in one tooth are in alignment with the lands in the following tooth and vice versa.

3. A veneer jointer head for cutting a straight edge in a stack of veneer sheets preparatory to joining said sheets in edge to edge abutting relationship comprising a wheel having a discontinuous periphery made up of a plurality of recesses, said recesses being defined by a sloping leading wall which terminates in a straight horizontal wall, and a vertical trailing wall normal to said horizontal wall, a plurality of cutting teeth mounted at about a 5° positive shear angle in the recesses on the wheel and projecting therefrom, each tooth comprising a main cutting surface having about a 5° positive rake angle, a plurality of tapered lands and grooves in the top of the tooth having sharpened leading edges, a tooth base mounted on the straight horizontal wall of the recess and projecting laterally approximately 1/8" from one side of the wheel, the throat of the tooth being V-shaped, a straight back wall on the tooth fastened to said vertical trailing wall in the recess, a finishing cutting edge formed along the side edge of the tooth projecting therefrom, the points on said finishing cutting edge which project farthest from the side of the wheel being those immediately adjacent the point at the projecting side where the base and face of the tooth meet each other, the lands and grooves in succeeding teeth being linearly staggered so that the grooves in one tooth are in alignment with the lands in the following tooth and vice versa.

4. A tooth for a veneer jointer rotary-type cutterhead comprising a plurality of tapered lands and grooves formed in the top surface of the tooth, the leading edges of the lands providing a horizontal main cutting edge, said tooth having a rectangular base portion with a side edge extending laterally beyond the side edge of the top surface, said tooth being characterized by a throat intermediate of the top surface of the base thereof, said throat being thinner than either the top surface or the base, a straight back wall on the tooth, a finishing cutting edge formed along the extending side edge angularly disposed with respect to the main cutting edge, the portions of said finishing edge immediately adjacent the point at the extending side where the base and face of the tooth meet each other extending farthest from the side of the tooth.

5. A veneer jointer head for cutting a straight edge in a stack of veneer sheets comprising a wheel having a discontinuous periphery made up of a plurality of recesses, a plurality of cutting teeth mounted in the recesses on the wheel and projecting therefrom, each tooth comprising a main cutting surface at a positive rake angle, a plurality of tapered lands and grooves in the top of the tooth having sharpened leading edges, a tooth base mounted in the recess and projecting laterally from one side of the wheel, a finishing cutting edge formed along the side edge of the tooth projecting therefrom, the lands and grooves in succeeding teeth being linearly staggered so that the grooves in one tooth are in alignment with the lands in the following tooth and vice versa.

References Cited in the file of this patent

UNITED STATES PATENTS

| | | |
|---|---|---|
| 74,521 | Emerson | Feb. 18, 1868 |
| 192,090 | Spaulding | June 19, 1877 |
| 192,526 | Pool | June 26, 1877 |
| 312,133 | Ledward | Feb. 10, 1885 |
| 325,679 | Ledward | Sept. 8, 1885 |
| 341,149 | Knowlton | May 4, 1886 |
| 2,024,520 | Gibbs | Dec. 17, 1935 |
| 2,671,947 | Vander Linde | Mar. 16, 1954 |

FOREIGN PATENTS

| | | |
|---|---|---|
| 457,187 | Germany | Mar. 10, 1928 |